United States Patent [19]
Hester et al.

[11] Patent Number: 5,667,693
[45] Date of Patent: Sep. 16, 1997

[54] EXCLUSION CHROMATOGRAPHIC SEPARATION OF IONIC FROM NONIONIC SOLUTES

[75] Inventors: Roger D. Hester, Hattiesburg, Miss.; George E. Farina, Killen, Ala.

[73] Assignees: Tennessee Valley Authority, Muscle Shoals, Ala.; University of Southern Mississippi, Hattiesburg, Miss.

[21] Appl. No.: 667,752

[22] Filed: Jun. 21, 1996

Related U.S. Application Data

[62] Division of Ser. No. 382,450, Feb. 2, 1995, Pat. No. 5,560,827.

[51] Int. Cl.[6] ..................................................... B01D 15/08
[52] U.S. Cl. ........................ 210/635; 210/656; 127/46.3
[58] Field of Search ................................. 210/635, 656, 210/659, 198.2; 127/46.2, 46.3, 30, 55

[56] References Cited

U.S. PATENT DOCUMENTS 5,407,580  4/1995  Hester ..................................... 210/656

OTHER PUBLICATIONS

Helfferich, Ion Exchange, McGraw–Hill Book Company, New York, 1962, pp. 134–135.
Wheaton, Annals New York Academy of Sciences, 1953, vol. 53, pp. 159–176.
Simpson, Chemical Engineering Progress, 1954, vol. 50, No. 1, pp. 45–49.
Nanguneri, Separation Sci. & Tech., 1990, vol. 25, pp. 1829–1842.
Neuman, Reactive Polymers, 1987, vol. 5, pp. 55–61.
Chen. Ind. Eng. Chem. Process Des. Devel., 1972, vol. 11, pp. 430–434.
Fornwalt, Chem. Eng., 1966, vol. 73, No. 10, pp. 155–160.
Humenick, "Water and Wastewater Treatment, Marcel Dekker".
Streat, J. Sep. Process Technol., 1980, vol. 1, No. 3, pp. 10–18.
Culp, Handbook of Advanced Wastement Treatment, Van Nostrand–Reinhold, New York, 1978, 249–197.
Laukson, Aiche Symp. Ser. 1974, vol. 70, No. 136, pp. 577–583.
Parkhurst, Water Pollut. Control Fed. J., 1967, vol. 39, No.10, pp. 70–81.
Wankat, Large Scale Adsorption and Chromatography, vol. II, CRC Process, Inc., Boca Raton, Fla., 1986, pp. 58–85.

Primary Examiner—Ernest G. Therkorn
Attorney, Agent, or Firm—Robert A. Petrusek

[57] ABSTRACT

A process for effectively and economically separating an ionic component such as acid from a nonionic component such as sugar in polar solutions using ion exclusion technology whereby the viability of using hydrolysis to convert wood and agricultural waste products such as corn stover into fuel alcohol is substantially effected. Underlying the gist of this invention are newly discovered methods by which dispersion, caused by shrinkage of resin within ion exclusion columns, is controlled resulting in operation of such columns, over a wide range of process conditions to produce separate and distinct elution profiles for the acid and sugar. Successful operation of these new ion exclusion methods, techniques, and systems can replace lime precipitation which currently is being used in acid hydrolysis processing. This not only obviates the need for the large quantities of acid and lime required therein, but also eliminates the unwanted and highly ecologically undesirable production of huge quantities of waste gypsum.

14 Claims, 6 Drawing Sheets

EXCLUSION CHROMATOGRAPHIC SEPARATION OF IONIC FROM NONIONIC SOLUTES

This application is a division of application Ser. No. 08/382,450, filed Feb. 2, 1995, now U.S. Pat. No. 5,560,827.

The invention described herein may be manufactured and used by or for the Government for governmental purposes without the payment to us of any royalty therefor.

INTRODUCTION

The present invention relates to substantial improvements in the area of utilizing ion exclusion resins to separate into its components a solution comprising ionic and nonionic components and including, for example, a solution comprising acid and sugar. For the purpose of the instant invention, hydrolyzates, or acid and sugar mixtures produced by the hydrolysis of a cellulosic material in the presence of an acid catalyst, and acid/sugar mixtures or synthetic mixtures produced by simple mixing in the laboratory, are referred to interchangeably. More particularly, the present invention comprises a discovery by which the previously observed problem, normally associated with ion exclusion and generally referred to as dispersion; which dispersion is attributed to shrinkage of the resin, is substantially eliminated by employing a new, different, distinct, and substantially effective technique which renders ion exclusion a viable processing technique for separating ionic and nonionic components in a solution, including acid/sugar mixtures or hydrolyzates, one from the other, on a commercial scale. As used herein resin in the "shrunken state" or just "shrunken" means and refers to a state in which, for example, a cross linked polystyrene, comprising the structure of the resin and having a $SO_3^-H^+$ functionality, contracts in the presence of similarly charged ions in the process fluid due to the force of repulsion. As used herein "resin in the swollen state" or just "swollen" or "swelled" means and refers to a state in which the cross linked polymer, for example, polystyrene, comprising the structure of the resin and having a $SO_3^-H^+$ functionality, expands to its fully relaxed state in the presence of a nonionic media which thoroughly penetrates the micropore structure of the resin. As used herein, dispersion means and refers to a broadening and flattening of the chromatogram elution profiles. The term "band broadening" is also used in chromatography to define this phenomenon, but this term will not be relied upon herein. Dispersion results from a variety of operating conditions including shrinkage, supra, which often results from introduction of an acidic solution into a column containing an exclusion resin bed therein and thereby effects a continuous change in concentration of the acid/sugar mixture above the resin bed. The resulting dilution of the mixture, in turn, results in an undesirable overlapping of the acid (ionic component) elution and sugar (nonionic component) elution streams from such resin bed. By eliminating or properly compensating for shrinkage, the resin, which acts as a sorbent in the process, effectively accelerates the elution of acid while at the same time retards the progress of the sugar through the column thereby permitting complete, reproducible, and predictable separation of the acid/sugar mixture. The separation is effected by the difference in the relative sorption strengths. Strong electrolytes, such as sulfuric acid, are mostly or completely excluded from ion exclusion type resins by the Donnan effect (F. Helfferich, *Ion Exchange*, McGraw-Hill Book Company, New York, 1962), and appear first in the discharge from the column. Nonelectrolytes, such as sugar molecules in aqueous solutions, are readily sorbed by such resins and, therefore, appear later in the discharge from the column. It has now been found that practice of the instant invention allows for continuous and protracted use of ion exclusion resin columns in large-scale or commercial-scale operations whereas heretofore, the only effective technique available to prior art practitioners for avoiding the deleterious effects of resin shrinkage was to use only relatively small charges of acid/sugar mixtures to the column, to thereby assure that elution of the separated constituents was effected before significant resin shrinkage occurred along with the resulting undesirable and deleterious effects thereof.

BACKGROUND OF THE INVENTION

1. Field of the Invention

As is well known, electrolytes can be separated from nonelectrolytes in solution therewith using any of a number of chromatographic techniques including: ion exchange, ion exclusion, and ion retardation. Ion exchange systems, in which ions are exchanged between the solute and the resin bed, have found wide application in industry due mostly to the systems ability to handle relatively high flux rates and a plethora of ionic species. However, because ion exchange does take place, regeneration of the resin is required. Ion exchange resins are typically classified as strongly or weakly acidic or strongly or weakly basic. Strongly acidic resins usually contain sulfonic acid groups, whereas weakly acid resins usually contain carboxylic acid groups. Strongly basic resins usually have quaternary ammonium groups while weakly basic resins usually contain polyamine groups.

An ion exchange resin with interchangeable $Na^+$ ions is said to be in its sodium form. Introducing an electrolyte such as an aqueous solution of $H_2SO_4$ to the system results in an exchange of the $Na^+$ with $H^+$ ions and convert the resin to its hydrogen form resulting in an elution of $Na^+$ from the column. The subsequent elution of $H^+$ ions from the column, commonly known as "breakthrough," indicates that the column resin has been mostly or fully spent. As may be appreciated, prior to the addition of more acid, such spent resin must be regenerated to its sodium form.

Ion exclusion systems, sometimes referred to as electrolyte exclusion systems, employ the same resins used in ion exchange systems, discussed supra, but differ in that the ionic functionality of the resin is the same as that of the electrolyte and, therefore, there is no exchange of ions. As will be appreciated, resins used in the instant invention are typically sulfonated polystyrenes with some degree of divinylbenzene (DVB) cross-linking which imparts physical stability to the resin polymer. The sulfonic acid functionality of the resin particles causes swelling in aqueous media. The resulting microporous resin particles can sorb water and nonionic solutes. The degree of molecular cross-linking with DVB influences the extent of sorption and prevents total dissolution of the porous resin. Because of ion repulsion and a high fixed acid chemical potential inside the resin microstructure, an electrolytic species, such as sulfuric acid in an acid/sugar mixture, for example, is effectively prevented from entering the porous resin. However, the nonionic sugar molecules are free to diffuse into the resin structure. Thus, electrolytes will pass through a packed resin bed faster than nonelectrolytes which are held up or delayed within the resin's microporous structure. In applying the instant invention to effect an acid separation similar to the separation used in the acid exchange system, supra, the resin used would be in its hydrogen form as opposed to the sodium form and, therefore, no ion exchange would occur in the system.

At the present time, ion exclusion technology is used for separation of ionic from nonionic or strongly ionic from weakly ionic solutes in polar media in certain analytical procedures, glycerin purification, and mixed acids separations applications (R. W. Wheaton and W. C. Bauman, *Annals New York Academy of Sciences*, 1953, Vol. 53, pp. 159–176). It differs from conventional ion exchange in that there is no net ion exchange between solute and resin. This eliminates the need for resin regeneration. Ion exclusion technology appears to have utility in separating ionic from nonionic species in aqueous solutions (D. W. Simpson and R. M. Wheaton, *Chemical Engineering Progress*, 1954, Vol. 50, No. 1, pp. 45–49). Basically, the ionic species are excluded from the fluid within the resin because of ionic repulsion within the resin particle micropore structure. This phenomena is explained by the Donnan exclusion principle, supra. Contrastingly, the nonionic species have no ionic repulsion with the resin and, therefore, penetrate the fluid within the porous resin to a greater degree. Thus, when a mixture of these two species is passed through a column of ion-exchange resin, the ionic component elutes first because it is excluded from the resin structure micropore volume. The nonionic species elutes after the ionic component because it has penetrated the resin micropore volume.

The physical and chemical characteristics of the resin are of vital importance to the design of an ion exclusion process. The total resin packed column volume can be thought of as to consist of three primary zones: 1) the macropore, also called void or interstitial volume, $V_o$, which is the liquid volume between the resin particles, 2) the micropore volume, also known as occluded volume, $V_p$, which is the liquid volume held within the resin particles, and 3) the solid resin network volume, $V_r$, which is the actual structure of the resin (S. R. Nanguneri and R. D. Hester, *Separation Sci. & Tech.*, 1990, Vol. 25, pp. 1829–1842). Due to the inherent ionic nature of the resin, an unequal distribution of ionic solute species exists between the micropore fluid (inside the resin) and macropore fluid (outside the resin) fluid phases. Thus, different resins with different pore volumes, ionic functionalities, and ionic charge density exhibit different separation characteristics with different solutes.

Ionic species which do not penetrate or slightly penetrate into the resin micropore volume have distribution coefficients close to zero. Nonionic species which can penetrate the resin micropore volume have distribution coefficients greater than zero but less than one. If a chemical affinity exists between a species and the resin, then the distribution coefficient can exceed one.

2. Description of the Prior Art

Ion exclusion, though widely used in analytical and pharmaceutical applications for many years, was not considered until recently for use in other than such applications due to the relatively low flux rates, small feed volumes, and weak electrolyte concentrations required to minimize dispersion and, thereby, provide for good species separation of the feedstock solution. Also, exacerbating the deleterious effects of dispersion caused by high flux rates, large feed volumes, and strong electrolyte concentrations was the dispersion caused by the presence of a so-called dead volume above the resin bed. Such dead volume resulted from shrinkage of the resin bed caused by the presence of a strong electrolyte such as sulfuric acid. Although identified as the primary factor contributing to dispersion, no successful means was devised until the discovery comprising the copending application of Hester et al., Ser. No. 08/128,174, filed, Sep. 29, 1993, to deal with this phenomenon of dead volume caused by resin shrinkage. For purposes of teaching, disclosing, and claiming the instant invention, the teachings, disclosure, and claims of said reference, supra, to wit, Hester et al., are herewith and hereby incorporated herein by reference thereto.

The possibility of using strongly acidic cation exchange resins for the separation and recycle of acid from synthetic solutions of glucose and sulfuric acid has been investigated (R. P. Neuman et al., *Reactive Polymers*, 1987, Vol. 5, pp. 55–61). The work conducted at that time using Rohm and Hass Amberlite IR-118 resin in the hydrogen form and using small columns demonstrated the potential for this type of process chromatography. Note: Any reference made herein to materials and/or apparatus which are identified by means of trademarks, trade names, etc., are included solely for the convenience of the reader and are not intended as, or to be construed, an endorsement of said materials and/or apparatus. Although no actual hydrolyzates were used in the work reported by Neuman et al., the synthetic solution containing 7.7 percent $H_2SO_4$ and 1.0 percent glucose showed separation of glucose from sulfuric acid at sample loading of 10 percent of the interstitial (column void) volume and at temperatures of 55° C. and 68° C. However, as noted by the authors, this work confirmed the potential for significant dispersion when operating even small ion exclusion systems.

The techniques revealed in the invention described and taught in the copending application of Hester et al., supra, readily lend themselves to batch applications, whereas the techniques revealed in the teachings of the instant invention are directed primarily to practice in semi-continuous or continuous applications, such as simulated moving bed (SMB) technology. SMB systems such as the Shanks merry-go-round have been applied in adsorption and ion exchange systems for many years. The Shanks system for leaching soda ash was introduced in England in 1841. The use of SMB or merry-go-round systems is quite common in the pharmaceutical industry as described in: (J. W. Chen et al., *Ind. Eng. Chem. Process Des. Devel.*, 1972, Vol. 11, p. 430); for activated carbon adsorption in the chemical industry (H. J. Fornwalt and R. A. Hutchins, *Chem. Eng.*, May 9, 1966, Vol. 73, No. 10, pp. 155–160) and (M. J. Humenick, Jr., "Water and Wastewater Treatment," *Calculations for Chemical and Physical Processes*, Marcel Dekker, New York, chap. 6, 1977); for ion exchange in uranium purification (M. Streat, *J. Sep. Process Technol.*, 1980, Vol. 1, No. 3, p. 10); and for waste water treatment with activated carbon (R. L. Culp et al., *Handbook of Advanced Wastewater Treatment*, 2nd ed., Van Nostrand-Reinhold, New York, chap. 6, 1978), and (C. T. Lawson and J. A. Fisher, *AIChE Symp. Ser.*, 1974, Vol. 70, No. 136, p. 577), and (J. D. Parkhurst et al., *Water Pollut. Control Fed. J.*, 1967, Vol. 39, No. 10, Part 2, pp. R70–R80). The primary advantages of SMB or similar systems in ion exclusion are the lower requirements (i.e., reductions of greater than 50 percent) for amounts of resin, water, and energy.

In work conducted at a time prior to the making of the instant invention, new methods and means were quite unexpectedly discovered to overcome or compensate for the deleterious effects of dispersion, which new methods and means much more efficiently utilized ion exclusion technology to separate ionic components from nonionic components in solution than were taught in the art prior thereto. This most recent advance in the prior art is discussed and claimed in greater detail in Hester et al., supra. Hester et al. teach utilizing a standard column or, more preferably, a combination of several columns operated in series hydraulic order which columns are adapted with a specially designed fixed or, more preferably, a specially designed movable or floating head distribution plate to effectively eliminate dispersion normally resulting from dead volume effected by the shrinkage of the ion exclusion resin when exposed to strong electrolytes such as sulfuric acid. In a principal embodiment envisioned by Hester et al. one or more columns of ion exchange resin, converted to its hydrogen form, hence ion exclusion resin, are subjected to repeated introduction at or into the uppermost regions thereof of hydrolyzate, nominally aqueous mixtures of sugar and sulfuric acid, followed by water washing, wherein separation therebetween is effected by the elution of the ionic component ahead of and completely apart from the nonionic component. In a convenient depiction thereof each column, in the case of a series of columns being utilized, is subjected to introduction of both the hydrolyzate and the wash water through introduction of same into or near the top of the floating head assembly and onto the upper surface of the resin bed followed by elution of the separated components at or near the bottom of the column. As taught in this most recent prior art, the force of gravity may be utilized to effect juxtaposition of the bottom surface of the floating head with the top or upper region of the resin bed so that as said resin bed shrinks, the so-called floating head is urged to stay in continual contact or close proximity therewith. For convenience, in said invention the preferred embodiment described introduction of the hydrolyzate and the wash water through the floating head and onto the top of the resin bed. This arrangement proved to be generally desirable in that it provided a readily useful method and means for effecting distribution in a more or less uniform manner of the input liquid onto the top of the resin bed. Also referenced in the copending application of Hester et al. is the teaching of utilizing a plurality of such columns in an arrangement known in the art as a simulated moving bed. For those who are not comfortably familiar with the art relating to large-scale or commercial-scale adsorption and chromatography applications, attention is directed to *Large-Scale Adsorption and Chromatography*, Volume II, Phillip C. Wankat, Ph.D., CRC Press, Inc. Boca Raton, Fla. 1986.

SUMMARY OF THE INVENTION

In one of the principal embodiments for effective practice of the instant invention, a plurality of ion exclusion columns are conveniently arranged and grouped into four zones in a manner like those shown in FIG. 6–10B of Wankat, supra, except that instead of moving the resin bed particles, the movement thereof is simulated in the manner and with means similar to that shown in FIG. 6–29 of Wankat, supra. In the arrangement and system utilized for explanation of this preferred embodiment of the instant invention, only one column or section is utilized per zone, it being understood, of course, that the resulting oversimplification is necessary for a clear understanding of the disclosure, but that in actual operation, a plurality of columns will be utilized for at least each of zones I and III. During operation of the system and practice of the instant invention, the fluid connections interfacing the input and the output of materials into and out of said zones together with the flow connections established and redirected via manifolds between said zones will be in a manner such that the feed streams for hydrolyzate and wash water and the collector receptacles for output of separated components remain stationary as do the individual ion exclusion columns, but, nevertheless the flow paths are directed and redirected via ports or valves therebetween in a sequenced manner so as to simulate a moving bed of ion exclusion resin. Accordingly, it will be appreciated that in the practice of the instant invention four zones are established in the manner and with the means shown in and described later in greater detail in the discussion of FIG. 1. For purposes of simplicity and ease of understanding, the description herein is directed to an arrangement wherein each zone comprises but a single column.

As has been previously noted, the instant, new, and novel invention may be used in substitution for either or both the floating head and the fixed head embodiments, first taught and claimed in Hester et al., supra. Nevertheless, it is anticipated that at least some of the beneficial effects of the floating head embodiment may conveniently and expeditiously be combined with those of the instant invention, when consideration is given to the fact that although practice of the instant invention eliminates any dead volume, at the entry point or interface juxtaposed feedstream entry into the column, the overall movement or shifting of the mass column during subsequent shrinkage gives rise to a region at the top of the column, wherein only eluded solutions sans resin particles are found. Accordingly, in order to prevent mixing of the eluded solutions in this upper area of the column, a movable collection device which can maintain juxtaposition with the resin particles at the top of the bed has now been found to effectively remediate the problem.

To the uninitiated, it might appear that the direction of flow through the column from either top to bottom or bottom to top is of little consequence since the force of gravity will act on the mass of the column to keep the resin particles comprising same juxtaposed the bottom zone and the floating head will maintain juxtaposition of its bottom surface with those resin particles comprising the top of the column. Contrary to this postulated conclusion, it has now been found that, indeed, in the unique combination now herein under consideration, superior results will be attained when the flow is upwardly directed through the column. Although this unexpected difference in performance of these two arrangements is not completely understood, it is believed that perhaps one of the more significant contributing factors thereto is that the deleterious effects attributable to channelization of fluid flow through the resin bed is more effectively countered when the bed particles are shifting downwardly to take up the slack for shrinkage of particles therebelow than is the case when particle shrinkage occurs in a direction from top-to-bottom of the bed as in Hester, supra. If this unexpected further improved resulting performance is indeed attributable to correction of the resin bed for resulting channelization, then it becomes an even more significant factor when the instant invention and system is operated on a continuous basis, as herein contemplated, since conventional use of externally induced mechanical means or stirring tends to interrupt such continuous operation.

OBJECTS OF THE INVENTION

It is therefore a principal object of the present invention to develop efficient and economical commercial-scale systems for separating electrolytes from nonelectrolytes or strong electrolytes from weak electrolytes in mixtures or hydrolyzates comprised, for instance, of acid and sugar by using a chromatographic method heretofore considered viable only for analytical applications or wherein sharp separations of species are not required.

Another principal object of the present invention is to develop a chromatographic system which minimizes the use of a displacing fluid, such as water, to force a hydrolyzate through a series of resin beds to thereby reduce dilution of product streams with such displacing fluid.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true scope and intent of the instant invention.

BRIEF DESCRIPTION OF THE DRAWINGS

The present invention will be better understood from a consideration of the following description taken in connection with the accompanying drawings in which:

FIGS. 1–5 represent both the original time slice or sequence and the four subsequent port switching sequences necessary to simulate a total looping of the columns back to the original position arbitrarily selected for the depiction comprising FIG. 1, supra.

Because an understanding of the valve sequencing for simulating movement of the bed from the point of view for an observer fixed on the ground, wherein he or she sees a stationary solid with valves changing the location of product and feed ports; therein is also included in each of the respective FIGS. 1–5 an indication of which inlet valves are open for feed of hydrolyzate and wash water from the input manifolds, and which outlet valves are open for directing recovered eluded streams of ionic and nonionic separated species to the collection manifold, both of said showings being by means of the respective valves being enclosed in a circle.

Figure 6:
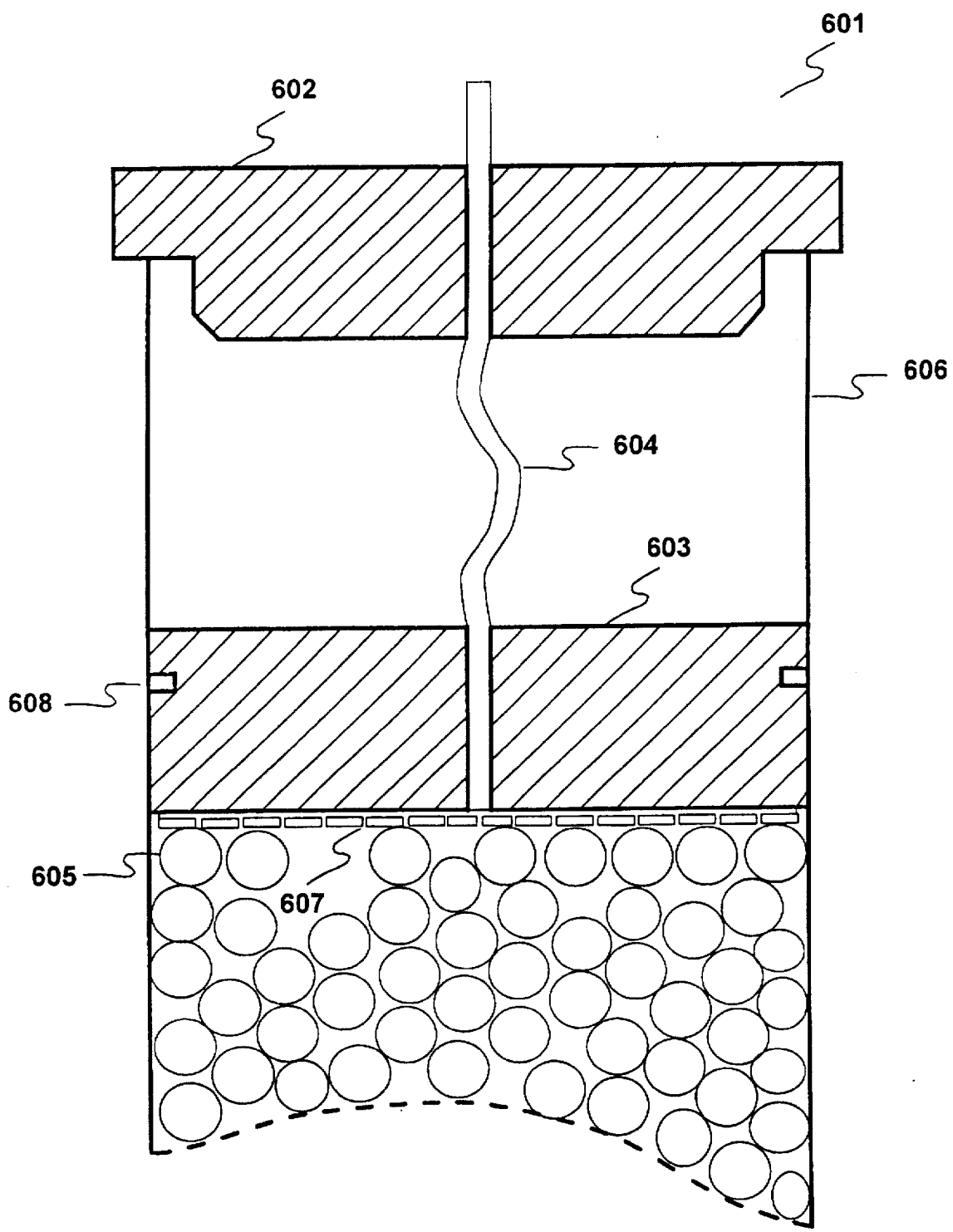

FIG. 6 represents one embodiment of the instant invention in cross-sectional, side-elevational view, taken along a line perpendicular to the longitudinal axis of any of the many resin columns employed in our system, with said line in a plane parallel to and coincident with said axis, wherein is depicted a movable fluid collecting assembly used to prevent principally cross-over contamination from the top discharge end of the column, particularly during the transition between cessation of ionic species elution and initiation of nonionic species solution.

DETAILED DESCRIPTION OF THE DRAWINGS

Figure 1:
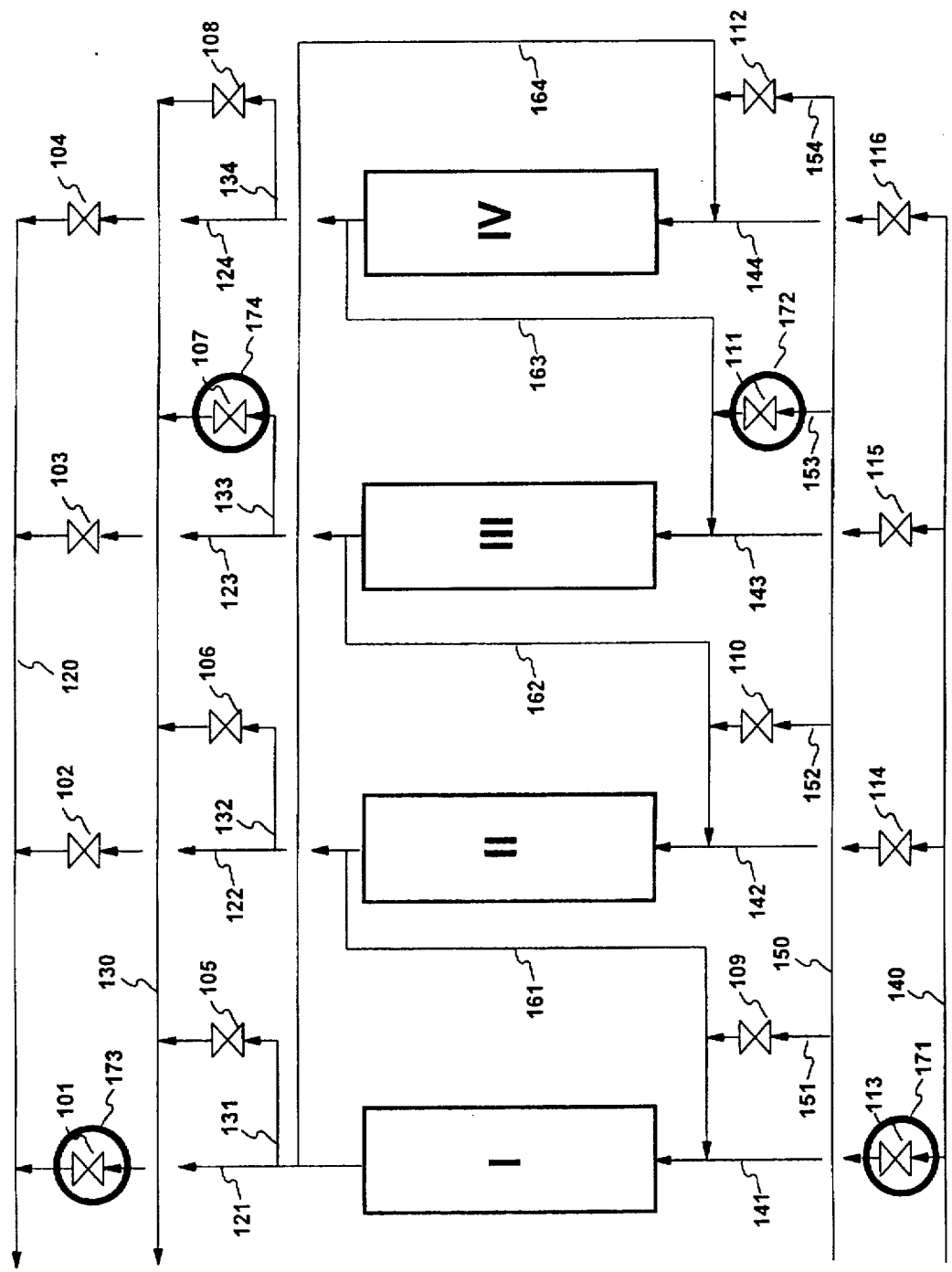
FIG. 1 represents one embodiment, in time slice mode, of the instant invention, wherein at time equal zero (in arbitrary dimension), a typical SMB arrangement is utilized in a new combination with ion exclusion resin, said resin being in its hydrogen form, and further combined with the most preferred embodiment of the instant invention, wherein flow of solution past the particles comprising the resin bed in each column is purposely directed in an upward direction to thereby substantially eliminate the necessity of employing a moveable feeder assembly to overcome, at the inlet end of each column, the deleterious effects of dispersion, which feeder assembly may be constructed in a manner similar to the floating head which is the subject of the prior filed, copending application of Hester et al., supra, it being understood; however, that, if desired, the instant invention may be practiced in a manner wherein both such upward flow and a modified version of such floating head design are combined in an alternative most preferred hybrid embodiment, albeit, the resulting moveable collector assembly or modified floating head device is not shown due to the great plethora of other means required for understanding of the port switching sequencing necessary for practice of the instant invention. Although discussed in greater detail below, it will become apparent to the reader that operation of the instant system incorporates a valve (or, as oftentimes herein used interchangeably therewith, port) switching sequence wherein simulation of the moving bed is in a direction such that zones appear to move from left to right and thereby to more closely approximate some of the prior art discussions of Wanket, supra. Nevertheless, it should be appreciated that the sequencing could be operated in another manner wherein the resulting simulation of a moving bed would be in the opposite direction.

Referring now specifically to FIG. 1, in the depiction shown therein, it will be noted that the four zones, to wit, I, II, III, and IV coincide, respectively, with outlet valves 101, 102, 103, and 104. Said outlet valves are shown as feeding the ionic outlet stream represented herein simply by line 120, which in the case of sugar-acid hydrolyzate will represent the acid recovery manifold. It will, of course, be appreciated that the flow of materials from zone I, II, III, and IV to and/or through said outlet valves 101, 102, 103, and 104 is through lines 121, 122, 123, and 124, respectively. In like manner, the collection manifold for the ionic species is simply represented via line 130, which is fed from zone I via line 131 and outlet valve 105; from zone II via line 132 and outlet valve 106; from zone III via line 133 and outlet valve 107; and, from zone IV via line 134 and outlet valve 108.

On the feed end of the system shown herein, it will be appreciated that a hydrolyzate feed stream may be introduced via manifold means herein represented simply as line 140 wherefrom via inlet valve 113 and line 141 same can be introduced into zone I. In like manner, hydrolyzate feed stream can be introduced from manifold 140 via inlet valve 114 and line 142 to zone II, via inlet valve 115 and line 143 to zone III, and via inlet valve 116 and line 144 to zone IV. Also, displacing fluid, i.e., in the case of an acid/sugar mixture, wash water, may be introduced through the input manifold means which is simply represented as line 150, wherefrom via inlet valve 109 and line 151 it may be introduced into zone I, via inlet valve 110 and line 152 it may be introduced into zone II, via inlet valve 111 and line 153 it may be introduced into zone III, and via inlet valve 112 and line 154 it may be introduced into zone IV.

In this first time slice, the valves have been switched in a manner wherein outlet valves 101 and 107, and inlet valves 113 and 111 are open and the remaining outlet and inlet valves, respectively, are closed. Accordingly, hydrolyzate is flowing to the inlet of zone 1 while the ionic species, separated at the opposite and outlet end thereof, is flowing through outlet valve 101. Simultaneously therewith, makeup wash water is being introduced into the inlet of zone III through inlet valve 111 and the nonionic species eluded from the other end thereof is being collected in manifold 130 through outlet valve 107. It will, of course, also be appreciated that simulated moving bed exchange systems of the type herein described require considerable desorbent, in this case, wash water. It is estimated that 10 to 20 weight percent units of wash water will be required to remove a single weight unit of sugar; therefore, the system must be provided with recycle means herein depicted as recycle lines 161–164 feeding recycle to zones I–IV, respectively.

For the arrangement shown herein, it will be understood that for zones II and IV, none of the inlet and outlet valves are open. For zone I, inlet valve 113 and outlet valve 101 are open and for zone III inlet valve 111 and outlet valve 107 are open. For ease of understanding and to facilitate more readily perceptual appreciation of this time slice and those shown and described in greater detail, infra, the open inlet and outlet valves are depicted enclosed in a bold line circle. More specifically, the circle enclosing open inlet hydrolyzate valve 113 is identified as 171. Likewise, the circle which encloses open displacing fluid inlet valve 111 is identified as 172. The circle which encloses open acid outlet valve 101 is identified as 173, and the circle which encloses open sugar outlet valve 107 is identified as 174. All other valves are in the closed position.

Figure 2:
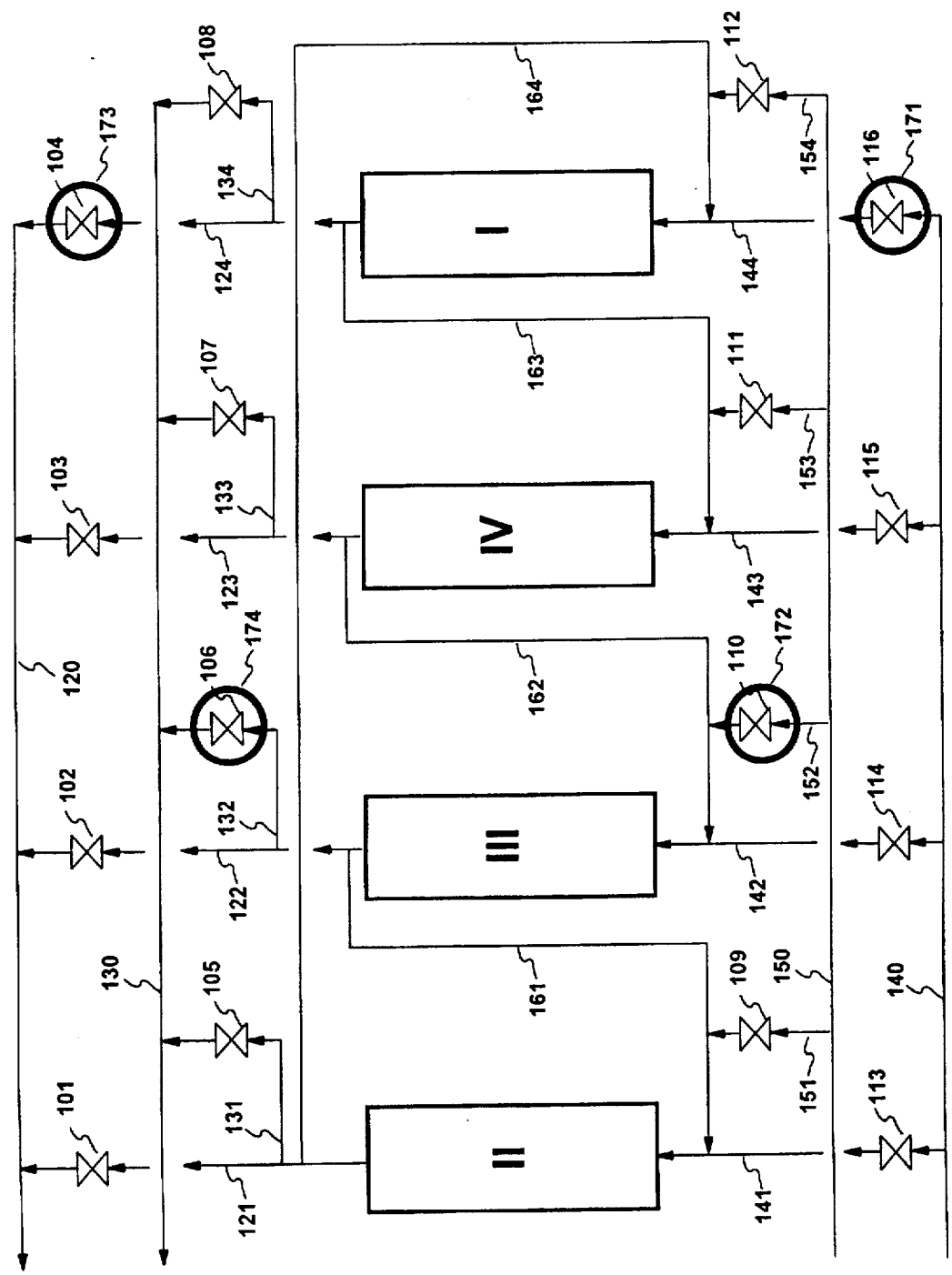

Referring now more specifically to FIG. 2, therein is shown the arrangement of the instant system subsequent to switching the valve arrangement depicted in FIG. 1 to that shown herein, wherein the inlet valves from the hydrolyzate and wash water manifolds which have now been switched to their open position are 116 and 110, respectively, and wherein the outlet valves for controlling flow to the ionic and nonionic eluded species to the respective manifolds are 104 and 106, respectively. Accordingly, it will be appreciated that as between the arrangement shown in FIG. 1, supra, at dimensionless time zero and the arrangement shown herein in FIG. 2 at an increment of dimensionless time subsequent thereto and after the first sequence of valve switching has been effected the simulation of the moving bed has the effect that the column which was zone IV in FIG. 1, is now herein FIG. 2 zone I and likewise the column which was zone I in FIG. 1, now herein FIG. 2 becomes zone II, the column which was zone II in FIG. 1 herein FIG. 2 becomes zone III, and the column which was zone III in FIG. 1 herein FIG. 2 becomes zone IV.

For the arrangement shown, it will again be appreciated that for zones II and IV none of the inlet valves are open. For zone I, acid inlet valve 116 and acid outlet valve 104 are open, and for zone III, water inlet valve 110 and sugar outlet valve 106 are open. Again, as in FIG. 1, herein FIG. 2 the open or activated inlet and outlet valves, supra, are shown enclosed in the respective circles referenced in the discussion, supra.

Figure 3:
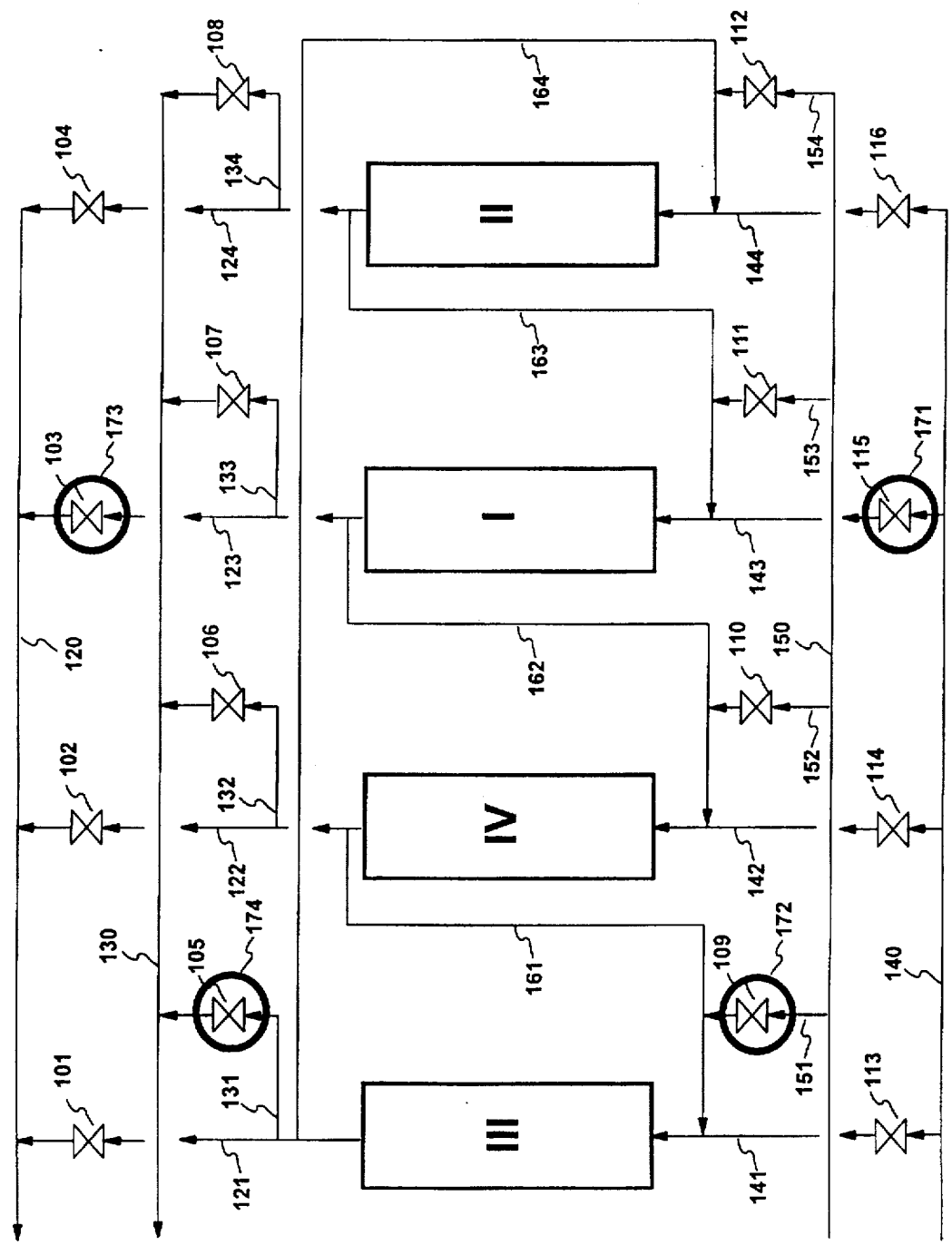
Figure 4:
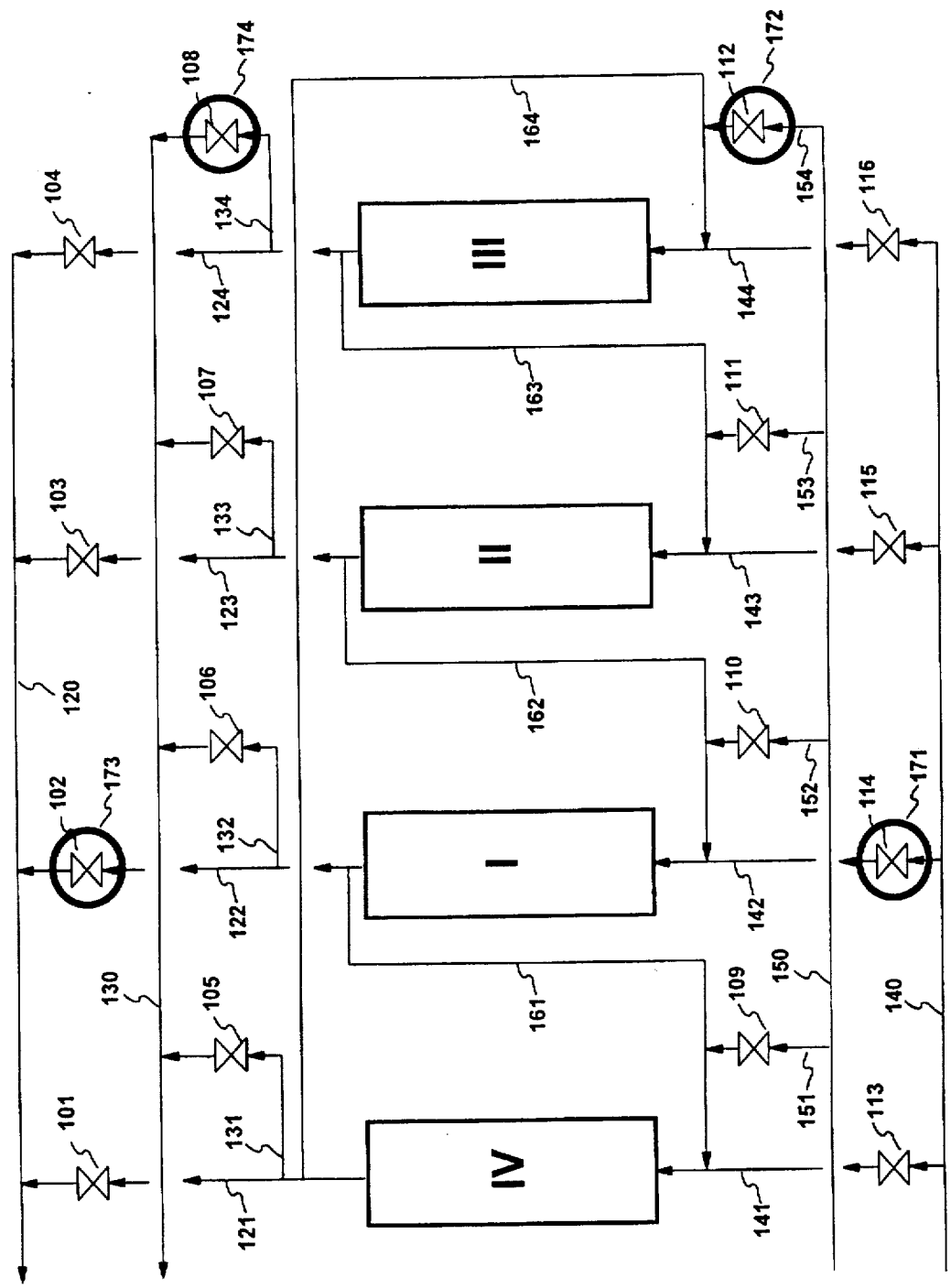
Figure 5:
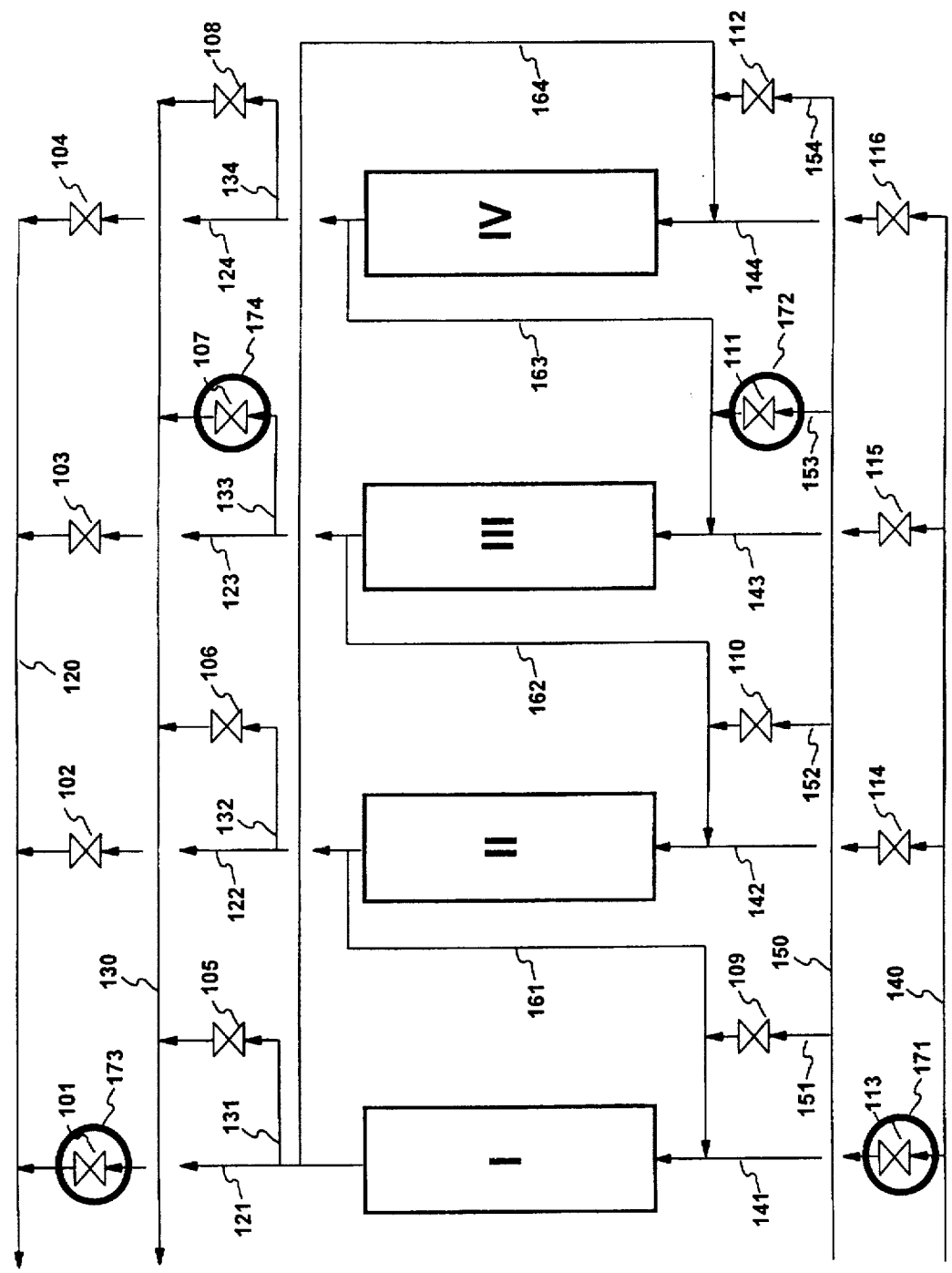

Referring now more specifically to FIGS. 3-5, therein are represented successive and subsequent sequenced stepping of valve switching similar to that described in FIG. 2, supra, wherein it may be seen that once again no inlet or outlet valves are open at the column, or group of columns, which represent either zones II or IV, that the sequencing of valve switching continues from and includes steps through valve 116, 115, 114, and finally back to 113. Likewise, starting with the arrangement shown in FIG. 2, the inlet wash water valve stepping sequences from that shown at 110 to 109, thence to 112, and finally back to 111 for zone III as it originally was shown in FIG. 1. As far as outlet valves to the ionic and nonionic manifold species represented by line 120 and 130, respectively, the total sequence starting with FIG. 1 and ending back with the same arrangement shown therein in FIG. 5 steps through respectively outlet valves 101, 104, 103, 102, and back to 101. Likewise, the valve stepping for the nonionic species outlet or collection manifold feed, with the arrangement shown in FIG. 1, steps through sequentially outlet valves 107, 106, 105, 108, and finally back again to 107.

Referring again to FIGS. 1-3, supra, it will be appreciated by those skilled in the art that more complete separation can be achieved by adding additional resin columns to at least some of the zones. For instance, all of the nonionic component, such as sugar, must be eluded from zone III in FIG. 1 before the first stepping to effect the valve switching for the arrangement shown in FIG. 2, else at least some nonionic species can be carried into zone IV in the arrangement of FIG. 2, and thence eventually into zone I in the arrangement or time slice represented in FIG. 3, whereby that portion of said nonionic species will inadvertently be released through open outlet valve 103 into manifold 120 providing unwanted cross-contamination of the principally ionic species collected thereby. One solution to the problem of achieving complete elution from the respective zones so there is no carry forward or backward for cross-contamination between the recovered species is to add additional columns to at least some of the zones.

Since it can be readily appreciated that as described, supra, the movement of the ionic species through the column is substantially and relatively greater than the hold up of the nonionic species into and out of the plethora of resin particles for movement through the column and further in view of the theoretical mathematical model as proposed in conjunction with Wanket's FIG. 610B, on page 59, operation and practice of the instant invention required that the relative movement of ionic species in zones I and II is in the same direction as the movement of the nonionic species in zone III, but opposite to the direction of the nonionic species in zones I and II. It will be appreciated that modeling which is principally directed to determining column size and number of columns leads to the conclusion that the number of resin columns which are to be utilized for separation and refluxing of nonionic species is substantially greater than the number required for like effect on the ionic species. With this in mind, it was determined through mathematical modeling that the number of columns which comprise zone I may preferably range from about 2-10 and most preferably may range from 3-9, whereas the number of columns which comprise zone III preferably should range from about 5-17 and most preferably be about 8-15.

Referring now specifically to FIG. 6, dilution or cross-contamination of the eluded streams caused by resin shrinkage in any column is eliminated, regardless of hydrolyzate feed conditions, by means and use of the instant movable collector assembly, generally illustrated at 601 and generally comprising end cap 602, movable portion 603, and flexible conduit 604. The density of the movable portion 603 of movable collector assembly is, or can be adjusted so as to float atop the resin as the resin bed changes in volume due to exposure to different acid environments. Movable portion 603 of collector assembly device 601 eliminates fluid dead volume above the resin bed comprised of a plethora of individual beds, one of which is generally illustrated at 605, which dead volume would otherwise contribute to cross-contamination in the pool of product which would normally be collected thereabove. For instance, fluid flowing up through the column, which column is generally illustrated at 606, enters the bottom of movable portion 603 of collector device 601 conveniently through any of a number of apertures, one is conveniently shown as aperture 607, and thence through conduit 604, part of which is shown within movable portion 603 of collector assembly 601, and thence through the coil or flexible section of tubing thereabove, and finally out through the aperture in end cap 602, it being understood, of course, that movable portion 603 of collector assembly 601 is of a cross-sectional area with the inside dimension of the column generally represented at 605. Also shown is sealing means 608 which can be of any of many convenient designs for ensuring that as movable portion 603 of collector assembly 601 shifts downward in column 605, the eluent collected through any of apertures 607 is directed through conduit 604, rather than short circuiting around movable portion 603. Although conduit 604 may most conveniently be a coiled or flexible piece of silicon or Teflon tubing, all that is really required is to provide compensation means for changes in juxtaposition caused by the relative movement between end cap 602 and movable portion 603. In addition, it will also be appreciated that although end cap 602 helps facilitate operation of the instant collector assembly, it can be dispensed with or incorporated in a composite design of the type shown in FIG. 3 of Hester, supra. Also, the specific gravity of movable portion 603 of collector assembly 601 is preferably provided in a manner adjusted so that the effective weight thereof on the bed of resin particles therebeneath is sufficient to maintain close juxtapositioning therebetween. Alternatively, any of a number of physical drive means shown or discussed in Hester, supra, may be utilized to maintain such close contact.

DESCRIPTION OF THE PREFERRED EMBODIMENTS

In accordance with the teachings of the present invention, electrolytes such as sulfuric acid can be efficiently recovered from nonelectrolytes such as glucose through a procedure employing ion exclusion resins. A principal embodiment of the instant invention utilizes a plurality of columns in the manner of a simulated moving bed with introduction and flow of fluids therethrough in a manner to either completely or substantially compensate for the deleterious effects of dispersion attributable to the so-called "dead volume." In this new and improved arrangement and technique there is no requirement to rely solely on floating heads of the type described in the invention of Hester et al., supra, to overcome the deleterious effects of dispersion at that end of the resin column wherein materials are introduced; however, as will be well appreciated from a further reading of these teachings, a device similar to such floating head may, if desired, be expeditiously employed as a moveable collecting assembly at the eluting end of the column to prevent unwanted or unintended mixing thereat of the elution streams, particularly during or near to the transition from output of elution of one species to another, i.e., when, for example, the elution of the ionic component is or nears completion and the elution of the nonionic component is about to, or has commenced.

In the practice of the instant invention, a plurality of ion exchange columns may be used in either the traditional manner or further modified for combination with use of the movable collector arrangement, supra. In either embodiment, the force of gravity is utilized to compensate for ion exclusion resin shrinkage upon exposure of same to an acid environment without the use, at or near the input ends of such columns, of a movable assembly, because the flow into such columns is into the bottom regions thereof. As will be described and shown in greater detail infra, the continuous solids flow fractionation system or as oftentimes referenced, the moving bed system depicted on page 59 of Wankat, supra, can be simulated in a manner wherein the resin is not physically moved through the columns comprising the system, but rather a technique of specially arranged manifolds and valves is utilized with preselected opening and closing of such valves to simulate resin movement through the system. More particularly, a further reading of the instant disclosure will reveal to those skilled in the art that the SMB arrangement shown on page 82 of Wankat, supra, closely approximates the simplest form of such a valving arrangement for practice of the instant invention with, of course, appropriately predetermined timed sequencing of input and output stream flows.

It should, of course, be remembered that although reference herein is made in a liberal manner to the disclosure and teachings of Wankat, supra, those prior art teachings are restricted to product separations with resins in the sodium form thereby requiring replacement and/or rejuvenation see, for example, page 70 of Wankat, supra, whereas the instant invention, which builds on the teachings and disclosures of Hester et al., supra, relies on and for the first time teaches methods, means, and techniques for employing such resins in their hydrogen form. This is important to remember since perhaps the most significant departure of the instant invention from that of Hester et al., supra, is the reversal of flow through the columns from bottom to top, rather than top to bottom. Although it may be argued that this flow reversal or countercurrent flow of input into the columns is anticipated by FIG. 6–29 on page 82 of Wankat, supra, it should be remembered that a significant departure of the teachings of the instant invention from that of Wankat, supra, is that the separation in such a SMB treatment is taught by utilizing exchange resins in their hydrogen form, rather than in their sodium form.

In addition, Wankat, supra, teaches that with his system all efforts should be maintained for minimizing the deleterious effects of dispersion and suggests in furtherance thereof that the columns be packed with ion exchange, rather than ion exclusion resins, said resins selected to be of the smallest diameter particle size practical. Such a practice of using small size resin particles, while increasing the effective mass transfer area and, consequently, the number of theoretical trays per unit length of column, does have drawbacks. A column packed with smaller resin particles would be more likely to become occluded; therefore, only feed solutions essentially free of even the smallest particulates could be used. In addition, as described in Nanguneri, S. R., "Design, Development and Analysis of a Preparative Scale Ion Exclusion Chromatography System," Ph.D Dissertation, the University of Southern Mississippi, smaller resin particles exhibit diminished separation properties since they tend to produce lower distribution coefficients. In the practice of one of the most preferred embodiments of the instant invention, exchange resins of relatively large size (50–100 mesh) having two percent DVB crosslinking versus the relatively small size (>400 mesh) recommended by Wankat, supra, produced excellent resolution of the sugar and acid elution profiles. On the other hand, as further described in Nanguneri, supra, the lower distribution coefficients caused by the smaller size resins can be offset by using resins containing lower levels of DVB crosslinking. However, the very small size recommended by Wankat, supra, would require resins with little structural integrity and, therefore, could not withstand the mechanical stresses exerted during normal expansion and shrinkage. It has now been found, quite unexpectedly, that the use of such larger size resin particles even in view of Wankat's, supra, admonition regarding such large resin particle size is advisable in the practice of the instant invention.

The upward flow in the columns in the instant invention causes the shrinking resin bed to be urged by gravity to remain in juxtaposition with the bottom of the container forming each individual column, and further that, at least initially, the greatest degree of shrinkage occurs in these bottom regions. Conveniently, the bottom of each of such container may be disposed in the manner of a solution sparger. As said resin continues to shrink and the effects thereof are evidenced in ever rising regions even further upward of such columns, it will be appreciated that the top of the column, once tightly packed with resin will move downwardly which will ordinarily give rise to formation of a pool of eluded solution thereover and that at the crossover point of operation wherein the ionic species has completely or substantially eluded and the nonionic species initiates elution, such resulting pool at the top of the column could give rise to an unwanted and undesirable mixing of the two now separated species. By providing a movable collector assembly, similar to the floating head of Hester et al., which follows the top of the shrinking resin bed downwardly through the force of gravity or with the aid of physical drive means, the size of the pool of eluded solution collected above the resin bed is minimized by removing same through the modified movable collector assembly to the collection manifolds. Accordingly, it should now be appreciated that the instant invention, by using countercurrent or upward flow, relies on the force of gravity rather than the prior art floating head to overcome the deleterious effects of dispersion at the input end of each resin column and relies on a new and novel movable collector at the output end of each column to prevent the resulting and otherwise efficient and very effective separation of species from remixing after they are eluded from the collecting end of the resin column.

As previously discussed, the phenomenon commonly referred to in the art as dispersion is effected, at least in part, from mechanical shrinkage of a packed resin column. In the practice of ion exclusion technology, resins which are suitable for use therein are delivered by the manufacturer in dry form and must be activated before being packed into such columns by exposure of same to aqueous media provided with requisite $H^+$ ions in concentrations sufficient to convert the resin to its hydrogen form. For example, the dry resin may be introduced into a container and mixed with sulfuric acid. Although not widely appreciated by some researchers, the contact of such resins with the conversion material such as sulfuric acid causes a relatively significant change in effective volume by causing shrinkage of the individual resin particles. Subsequent to such conversion, however, the resin must be washed with hydrogen ion-free aqueous media as, for instance, water, to remove excess $H^+$ ions. Again, although not widely appreciated by some researchers, the subsequent washing of the resin, now converted to the hydrogen ion form, causes a reversal of the change in volume whereby the individual resin particles swell and thereby increase in size. Subsequently, the resulting washed and swollen resin is packed into the column in a manner wherein no discontinuities or voids other than those normally attributable to packing volume are allowed. The relative changes in volume, i.e., by either shrinkage or swelling can account for changes in total resin volume equivalent to about 20 percent.

It will now be appreciated that when the resulting packed column is utilized for purposes of ion exclusion with a mixture such as acid and sugar as described in the prior art portions of the copending application of Hester et al., the exposure of the resin particles to the acidic component therein will cause same to shrink, thereby effecting a contraction of the column packing and consequently effecting a so-called dead volume at the uppermost portion thereof. It will also be appreciated as more of the acid/sugar mixture or hydrolyzate is added to the column, such shrinkage will be effected ultimately throughout the length of the column. Accordingly, the dead volume above the resin material in the Hester arrangement will become a heel of acid/sugar feedstock of ever changing size and concentration as the acid component either moves rapidly through the intricacies comprising the packing volume throughout the column or is prevented from entering the resin bed because of the Donnan effect while the sugar molecules become defused into the resin microstructure. The net effect is to cause a volume of ever changing size and of ever changing mixture concentration in the heel interfaced with the top of the resin column so as to effect flattening and broadening of the elution profiles of both the acid and the sugar components, whereby the desired good species separation as clean cuts of two eluent streams is not realized. For a more complete understanding of the significance of such dispersion, attention is directed to Nanguneri, supra.

Practice of the instant invention through application of the new instant procedures and techniques has been found to maximize the performance of the resin bed thereby permitting efficient operation of same at significantly higher feed volumes, flux rates, and electrolyte concentrations than heretofore obtainable in standard ion bed systems. Therefore, by utilizing upward flow in the resin bed columns there is eliminated a so-called dead volume juxtaposed the inlet end of the resin bed without requiring the use of any movable mechanical aid such as the floating head, supra, whereby it is possible to more accurately mathematically model large-scale ion exclusion chromatography systems since dispersion caused by high acid concentrations, high flux rates, and large feed volumes can be readily predicted. In addition, as described herein, through the practice of the most preferred embodiment of the instant invention, it is possible to achieve even further and more significant performance enhancement in the operation of ion exclusion chromatography systems. In this most preferred embodiment, it is possible to counter the effect of resin shrinkage which occurs when said resins are exposed to normal column cycling as described herein by combining such upward flow with the use of a collection device movable within and complementary, in cross-section, to the portion of the resin columns within which it is designed to operate.

It has now been discovered that the objectives of the instant invention can easily and effectively be attained by redirecting the flow of fluids through the column so that movement thereof is in an upward, rather than in the downward manner which is suggested by the teachings of Hester et al., supra. The net result of this innovation is to cause the resin particles at the bottom of the column or container to initially be contacted with the most acidic hydrolyzate environment, rather than the particles at the top of the column which is the case under the heretofore customary prescribed manner of operation. Accordingly, it will be appreciated that the initial shrinkage of the resin particles takes place in the bottom of the container, rather than at the top and that the force of gravity acting on the plethora of particles comprising the bed therein simply, but very effectively forces the bed down to and in contact with the vessel bottom so that the deleterious effects of a dead volume are minimized or precluded. As the acid constituent of the feedstock initiates shrinkage of the resin particles, any would-be dead volume thereunder is immediately filled by downward movement of the bed. Of course, as the resin particles are caused to further shrink and contract in the bed, the mass of resin particles in the column effectively moves downwardly to maintain the interface between its bottommost portion and the bottom of the container, thereby ensuring that no, or substantially no, dead volume is allowed to form at, or juxtaposed said inlet interface from which the unwanted and undesired results of the phenomenon of dispersion can result. In short, the instant new and novel embodiment prevents establishment of any substantial depth or thickness of an ever-changing concentration of an acid/sugar mixture between the bottom of the packed column and the bottom of the container forming the column.

INVENTION PARAMETERS

After sifting and winnowing through the data supra, as well as other results and operations of our new, novel, and improved technique, including materials and information incorporated herein by reference thereto, methods and means for the effecting thereof, the operating variables, including the acceptable and preferred conditions for carrying out our invention are summarized below:

| Variables | Operating Limits | Preferred Limits | Most Preferred Limits |
|---|---|---|---|
| Acid Concentration (% $H_2SO_4$) | 1.0–20.0 | 3–17 | 5–15 |
| Column Aspect Ratio | 0.25–50 | 0.5–8.0 | 1.0–5.0 |
| No. of Columns (Total) | 5–50 | 10–35 | 15–30 |
| Zone I | 1–14 | 2–10 | 3–9 |
| Zone II | 1–9 | 2–5 | 3–4 |
| Zone III | 2–23 | 5–17 | 8–15 |
| Zone IV* | 1–4 | 1–3 | 1–2 |
| Resin (% DVB cross-linking) | 1.0–15.0 | 2.0–12.0 | 2.0–8.0 |

*In the embodiment wherein the lower limit of number of columns is zero, the system can be considered as being comprised of a three (3) zone, rather than of four (4) zones.

These parameters represent the principal parameters that must be kept in mind in predetermining or otherwise arriving at acceptable operation of those aspects of the instant invention pertaining to column chromatography. A less obvious but equally important parameter is column length or, in the SMB system, aspect ratio, i.e., ratio of column length to column width/diameter. As described in Hester et al., supra, particularly as it applies to single column operation, an acceptable column operation at higher feed volumes is possible with use of a longer column. In designing such a single column system, it is of utmost importance to mathematically predict that column length required. On the other hand, for the application herein being considered, the effective column length needed to prevent a mixing of the elution streams is a factor of the length of the number of columns which are employed to effect any particular zone. However, since the sugar or nonionic species elution time is always greater than that of the ionic species this consideration is of the most importance in the system design arrangement. The use of the instant invention allows designers to accurately predict, by means of readily available theoretical correlations of the type set forth in Wankat, the operating characteristics of any ion exclusion column chromatography systems by otherwise avoiding consideration of the less quantifiable phenomena caused by the presence of a dilution layer both at the inlet end and outlet end of the resin bed. Accordingly, the results of one such model used to predict total column length and number of columns in each zone, as depicted infra, are summarized below. The results are for an IEC system consisting of 10 centimeter diameter columns operating with the following conditions: a feed of 100 grams per minute containing 7 percent glucose and 7 percent sulfuric acid; a recycle flow rate, resin macropore fluid flow rate, and resin micropore fluid flow rate of 290 grams per minute, respectively; a water flow rate of 134 grams per minute; and 95 percent acid and sugar recovery efficiencies. Additionally, the height equivalent to a theoretical plate (HETP) for acid was estimated at 0.2 centimeters and the HETP for sugar was estimated to be 4 centimeters, the sugar partition coefficient was set at 0.4 and the acid partition coefficient was set at 0.05. The partition coefficients as well as the HETP values were estimated from data collected in tests described in Hester, et al., supra. The sugar concentration in the recycle fluid entering zone IV, see page 59, of Wankat, supra, was set at 0.02 percent. Since the recycle flow was assumed equal the macropore fluid flow, the sugar concentration at the top plate is equal to the sugar concentration of the recycle fluid. The general formula used for the system model is:

$$x_{n+1} = x_n + (L^*(x_n - x_{n-1})/R^*Ks + Q)$$

where
R=Resin micropore fluid flow, (gm/min)
Q=Resin macropore fluid flow, (gm/min)
$x_n$=Sugar concentration of the $n^{th}$ tray, (percent)
L=Total of the input and output streams at the various zones, (gm/min)
Ks=Sugar distribution coefficient

| | IEC System Design |
|---|---|
| Individual column length | 30 cm |
| Columns in Zone I | 8 |
| Columns in Zone II | 3 |
| Columns in Zone III | 11 |
| Columns in Zone IV | 1 |
| Total number of columns | 23 |
| Total column length | 690 cm |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for effecting separation of components in a solution comprising an ionic component and a nonionic component, the concentration of said ionic component ranging from about 1 weight percent to about 20 weight percent, and the concentration of said nonionic component ranging from about 1 weight percent to about 25 weight percent, said improved process comprising the steps of:

(1) maintaining three zones operatively connected to one another in hydraulic order, said hydraulic order comprising flow of later mentioned side streams from an outlet of the third zone to the inlet of the second zone, from the outlet of the second zone to the inlet of the first zone and from the outlet of the first zone to the inlet of the third zone, each of said zones containing a bed of ion exchange resin, said resin being in its hydrogen form;

(2) introducing a stream of said solution into said inlet of said first zone;

(3) simultaneously withdrawing from an outlet of said first zone, a stream of ionic component-enriched, nonionic component-depleted solution as product and introducing a side stream of same into an inlet of said third zone;

(4) simultaneously introducing aqueous media, which is both substantially ionic component-free and substantially nonionic component-free, into said inlet of said third zone and withdrawing from an outlet thereof a stream of relatively nonionic component-rich, substantially ionic component-depleted solution as product and introducing a side stream of same into an inlet of said second zone and withdrawing from an outlet of said second zone an ionic component-depleted and nonionic component-depleted solution and introducing a side stream of same into the inlet of said first zone;

(5) effecting a stepped change in the flow connections for introduction and withdrawal of solutions among said zones wherein the flow of said solutions is redirected such that:
   (a) the solutions which were introduced into and withdrawn from the column, or columns which comprised said first zone are redirected to and from the column, or columns which comprised said third zone,
   (b) the solutions which were introduced into and withdrawn from the column, or columns which comprised said third zone are redirected to and from the column, or columns which comprised said second zone, and
   (c) maintaining the flow connections of said side streams, whereby, upon effecting said stepped change, the bed of resin which comprised said first zone becomes said second zone, the bed of resin which comprised said second zone becomes said third zone, and the bed of resin which comprised said third zone becomes said first zone and further whereby said stepped change simulates movement of said resin in a direction from said first zone through said second zone and then though said third zone; and
(6) thereafter intermittently effecting subsequent stepped changes in the flow connections among said zones to further simulate said movement of said zones.

2. The improved process of claim 1, wherein said first zone comprises a plurality of subzones with each subzone containing a bed of ion exchange resin, said resin being in its hydrogen form, wherein each subzone is flow connected in series, one to the other, alternately through inlets and outlets operatively associated therewith, wherein the inlet of the first subzone in such series is initially the inlet of said first zone, wherein the outlet of the last subzone in such series is initially the outlet of said first zone, and wherein the intermittently effected subsequent stepped changes in the flow connections among said zones simulates movement of said resin through said first zone in the direction from the last subzone toward the first subzone and opposite to that of fluid flow.

3. The improved process of claim 2, wherein said third zone comprises a plurality of subzones with each subzone containing a bed of ion exchange resin, said resin being in its hydrogen form, wherein each subzone is flow connected in series, one to the other, alternately through inlets and outlets operatively associated therewith, wherein the inlet of the first subzone in such series is initially the inlet of said third zone, wherein the outlet of the last subzone in such series is initially the outlet of said third zone, and wherein the intermittently effected subsequent stepped changes in the flow connections among said zones simulates movement of said resin through said first zone in the direction from the last subzone toward the first subzone and opposite to that of fluid flow.

4. The improved process of claim 3, wherein said second zone comprises a plurality of subzones with each subzone containing a bed of ion exchange resin, said resin being in its hydrogen form, wherein each subzone is flow connected in series, one to the other, alternately through inlets and outlets operatively associated therewith, wherein the inlet of the first subzone in such series is initially the inlet of said second zone, wherein the outlet of the last subzone in such series is initially the outlet of said second zone, and wherein the intermittently effected subsequent stepped changes in the flow connections among said zones simulates movement of said resin through said first zone in the direction from the last subzone toward the first subzone and opposite to that of fluid flow.

5. The improved process of claim 4, wherein said second zone comprises from about 1 to about 9 subzones.

6. The improved process of claim 5, wherein said inlets and said outlets of said zone and of said subzones are generally juxtaposed the bottommost regions and the uppermost regions, respectively, of said zones and said subzones.

7. The improved process of claim 6, wherein each of said outlets of said zone and of said subzones are operatively associated with a physical barrier having a peripheral configuration complementary to the cross-sectional dimension of each said uppermost region and adapted for slidable engagement therewith for maintaining juxtaposition of said physical barrier with the top on the bed of resin in each such zone and subzone to thereby substantially prevent the establishment over each said bed, of any substantial solution interface.

8. The improved process of claim 3, wherein said third zone comprises in the range of from about 2 to about 23 subzones.

9. The improved process of claim 8, wherein said inlets and said outlets of said zone and of said subzones are generally juxtaposed the bottommost regions and the uppermost regions, respectively, of said zones and said subzones.

10. The improved process of claim 9, wherein each of said outlets of said zone and of said subzones are operatively associated with a physical barrier having a peripheral configuration complementary to the cross-sectional dimension of each said uppermost region and adapted for slidable engagement therewith for maintaining juxtaposition of said physical barrier with the top on the bed of resin in each such zone and subzone to thereby substantially prevent the establishment over each said bed, of any substantial solution interface.

11. The improved process of claim 2, wherein said first zone comprises from about 1 to about 14 subzones.

12. The improved process of claim 11, wherein said inlets and said outlets of said zone and of said subzones are generally juxtaposed the bottommost regions and the uppermost regions, respectively, of said zones and said subzones.

13. The improved process of claim 12, wherein each of said outlets of said zone and of said subzones are operatively associated with a physical barrier having a peripheral configuration complementary to the cross-sectional dimension of each said uppermost region and adapted for slidable engagement therewith for maintaining juxtaposition of said physical barrier with the top on the bed of resin in each such zone and subzone to thereby substantially prevent the establishment over each said bed, of any substantial solution interface.

14. The improved process of claim 1, wherein said inlets and said outlets of said zones are generally juxtaposed the bottommost regions and the uppermost regions, respectively, of said zones.

* * * * *